(12) United States Patent
Tomaiwa et al.

(10) Patent No.: US 7,789,447 B2
(45) Date of Patent: Sep. 7, 2010

(54) HEIGHT ADJUSTER FOR A SEAT OF A VEHICLE

(75) Inventors: Konomu Tomaiwa, Inuyama (JP); Masashi Mitsukuchi, Konan (JP)

(73) Assignee: Kabushiki Kaisha Imasen Denki Seisakusho, Aichi (JP)

( * ) Notice: Subject to any disclaimer, the term of this patent is extended or adjusted under 35 U.S.C. 154(b) by 819 days.

(21) Appl. No.: 11/733,486

(22) Filed: Apr. 10, 2007

(65) Prior Publication Data

US 2007/0252424 A1 Nov. 1, 2007

(30) Foreign Application Priority Data

Apr. 27, 2006 (JP) ............................. 2006-123348

(51) Int. Cl.
*B60N 2/06* (2006.01)

(52) U.S. Cl. .................................. 296/65.11

(58) Field of Classification Search ............. 296/65.11, 296/65.01; 297/344.24, 344.21, 344.11, 297/344.12, 344.13, 463.1; 414/921
See application file for complete search history.

(56) References Cited

U.S. PATENT DOCUMENTS

| | | | | | |
|---|---|---|---|---|---|
| 4,155,587 | A | * | 5/1979 | Mitchell | 296/65.12 |
| 6,543,848 | B1 | * | 4/2003 | Suga et al. | 297/344.24 |
| 2001/0038223 | A1 | * | 11/2001 | Suga et al. | 296/65.11 |
| 2005/0218686 | A1 | * | 10/2005 | Takenoshita et al. | 296/65.11 |

FOREIGN PATENT DOCUMENTS

| | | |
|---|---|---|
| JP | 3042326 | 5/1996 |
| JP | 09-058315 | 3/1997 |
| JP | 2003-291697 | 10/2003 |
| JP | 2004-106817 | 4/2004 |
| JP | 2005-053247 | 3/2005 |

OTHER PUBLICATIONS

Office Action of Patent Application No. JP2006-123348. Mailing Date: Sep. 2, 2008. Agent: Akihito Tashita.

* cited by examiner

*Primary Examiner*—H Gutman
(74) *Attorney, Agent, or Firm*—Lucas & Mercanti, LLP

(57) ABSTRACT

The present invention provides a height adjuster for a seat of a vehicle capable of lowering equipment height in an accommodated state. A four-joint link mechanism 40a, 40b configuring the fourth layer are provided with a first arm 47 formed the first guide face 47d guiding a guide roller 35 formed on a third layer, a second arm 42 and a first reinforce member 43. The arms and the rear end of a first reinforce member is turnably pivoted to a first bearing 41 and the front end of a first reinforce member is turnably pivoted to a second bearing 48 by the shaft members 45 and 42h. Each link mechanism is lowered while depicting the trajectory that corresponds to the curve of the first guide face 47d and turning the front end. Because a first reinforce member 43 is provided. Although a portion at which the first guide face 47d of the first arm 47 is formed is smaller in thickness of a vertical direction than a portion at which the first guide face 47d is not formed. It is possible to compensate for insufficient strength of the first arm 47. Thus, the height of the height adjuster for a seat of a vehicle can be lowered.

4 Claims, 16 Drawing Sheets

(a)

(b)

(c)

(d)

(e)

HEIGHT ADJUSTER FOR A SEAT OF A VEHICLE

BACKGROUND OF THE INVENTION

1. Field of the Invention

The present invention relates to an apparatus for elevating a vehicle seat via a door opening between a vehicle inside and a vehicle outside.

2. Description of the Related Art

Conventionally, it has been well known that a height adjuster for a seat of a vehicle of this type are described in Japanese Patent No. 3042326 and JP 2005-53247 A.

The height adjuster described in Japanese Patent No. 3042326 is provided with a pair of guide rails disposed to be opposed to each other on a floor face of a vehicle; a runner member that moves forward or backward along each of the guide rails; a ball screw that causes this runner member to move forward or backward; a motor that rotates this ball screw; lift arms mounted by one pair at the left and right of the runner member; a lift base that is elevated via each of the lift arms, the lift base on which a physically-handicapped person seat is placed; a rotation device mounted on this lift base, the rotation device rotating the physically-handicapped person seat; and lift guide rollers each mounted at an end part of each of the guide rails, the lift guide roller that elevates and guides a lower lift arm.

In addition, the rotation device is operated, the physically-handicapped person seat is rotated at 90 degrees toward a door opening, a motor is activated, and then, the ball screw is rotated. In this manner, the runner member moves toward the door opening along each of the guide rails, and then, the lift base linked with the runner member via the lift arm moves to the door opening side along each of the guide rails. At this time, a lower face of the lower lift arm is further lowered and swung out while it is supported in abutment with the lift guide roller, and then, the physically-handicapped person seat placed on the lift base is also gradually swung out to the outside.

The height adjuster described in JP 2005-53247 A is provided with a swivel mechanism for swiveling a seat; a slide mechanism for sliding a seat; and an adjuster mechanism for elevating a seat through a door opening. The adjuster mechanism is provided with a pair of left and right guide rails that extends toward the door opening; a base plate that can slide along each of the guide rails; link arms turnably assembled by one pair at the left and right of the base plate; a seat mount base mounted on a front end of each of the link arms; rotatable, columnar engagement portions each provided rearward of each lower link arm; and cam members each engaged with each of the engagement portions and movably supporting each of the lower link arms.

In addition, by means of the swivel mechanism, a seat is swiveled up to a position opposed to the door opening, and, by means of the slide mechanism, a mount base on which the seat has been placed is slid up to a position that protrudes from the door opening to the vehicle outside. Subsequently, by means of the slide mechanism, when the base plate advances, the engagement portion of the lower link arm moves along an engagement face of the cam member, and then, the seat supported on the mount base is lowered in a horizontal state at trajectory that corresponds to the shape of the engagement face of the cam member.

[Prior Art 1] Japanese Patent No. 3042326 (Paragraphs 11 to 15 and FIG. 1) is incorporated herein by reference.

[Prior Art 2] JP 2005-53247 A (Paragraph 14 and FIG. 2 to FIG. 6) is incorporated herein by reference.

DISCLOSURE OF THE INVENTION

Summary of the Invention

Problems to be Solved by the Invention

However, in the conventional techniques described above, a four-joint link mechanism is used as a mechanism for elevating a vehicle seat. Two arms configuring the four-joint link mechanism are disposed vertically in an accommodated state. Therefore, there is a problem that the height of a height adjuster in the accommodated state increases. If the height of the height adjuster thus increases, a seat face of the vehicle seat also increases, thus reducing a head clearance of a person who is sitting at the vehicle seat.

Therefore, it is a primary object of the present invention to provide a height adjuster for a seat of a vehicle capable of lowering equipment height in an accommodated state.

Means For Solving The Problem

In order to achieve the above object, a height adjuster for a seat of a vehicle according to the present invention is comprised:

a support base placed in a vehicle;

a mount base slidably disposed over the support base, the mount base mounting a seat portion of the vehicle seat; and first and second link mechanisms disposed between the support base and the mount base, the link mechanisms being opposed to each other to link the support base and the mount base, said link mechanisms each being configured to lower the mount base that has slid toward a door opening over the support base to an outside of a vehicle that is lower than an inside of the vehicle via the door opening from the upside of the support base and to rise the mount base that has lowered to the outside of the vehicle to a position before lowered, wherein rotatably pivoted rotational members are provided at both sides of end parts at the door opening side of the support base in a state in which the mount base can slide toward the door opening, each of the link mechanisms is provided with:

first and second turning shafts turnably pivoted about the support base;

third and fourth turning shafts turnably pivoted about the mount base;

a first planar member of which a plate face of one end and a plate face of the other end are turnably pivoted about the first turning shaft and about the third turning shaft, respectively, a first guide face formed in a curved shape in which the rotational member relatively rolls is formed to be recessed from a lower end face toward an upper end face, and further, a height from the upper end face of a portion at which the first guide face is formed up to the first guide face is formed to be lower than a height from the upper end face to the lower end face of a portion at which the first guide face is not formed;

a first planar reinforce member of which a plate face of one end and a plate face of the other end are pivoted about the first turning shaft and about the third turning axis, respectively, the first reinforce member being adapted to reinforce the first planar member; and a second planar member of which a plate face of one end is turnably pivoted about the second turning shaft and a plate face of the other end is turnably pivoted about the fourth turning shaft, respectively, and wherein said each rotational member relatively rolls along said each first guide face of said each first planar member, whereby said mount base pivoted about said each link mechanism is configured to be elevated at trajectory that corresponds to a shape of said each first guide face.

A first planar reinforce member for reinforcing a first planar member is provided, and thus, the lowering of rigidity of the first planar member due to lowly forming a height from an upper end face of the first planar member up to a first guide face can be compensated for by means of the first reinforce member.

Therefore, even if the height from an upper end face to a lower end face of a portion at which the first guide face is not formed is not increased, the first guide face can be formed, thus making it possible to lowering the height of the height adjuster for a seat of a vehicle in a state in which each link mechanism is accommodated between a support base and a mount base.

A height adjuster for a seat of a vehicle in accordance with the more preferred teaching of the present invention is comprised: wherein a second reinforce member having a second guide face that is formed in a shape identical to the first guide face is fixed between the first planar member and the first reinforce member in said each link mechanism, and wherein said each rotational member relatively rolls along said each first guide face of said each first planar member and said each second guide face of said each second reinforce member, whereby said mount base pivoted about said each link mechanism is configured to be elevated at trajectory that corresponds to a shape of each of the first and second guide faces.

A second reinforce member having a second guide face that is formed in the same shape as that of the first guide face is fixed between the first planar member and the first reinforce member of each link mechanism, thus making it possible to enhance the rigidity of the first planar member more significantly.

A height adjuster for a seat of a vehicle in accordance with the more preferred teaching of the present invention is comprised:

a swivel device for swiveling the support base between a predetermined position in the vehicle chamber and a position toward the door opening; and a slide device for sliding the support base in a longitudinal direction of the vehicle.

In a height adjuster for a seat of a vehicle comprising a slide device and a swivel device, there is a tendency that the height of the entire equipment is larger than that in the case where such an apparatus is not provided. Thus, although restriction of the height of the entire equipment is strongly demanded, according to the invention according the present invention, the height of each link mechanism can be restricted, thus making it possible to contribute to restriction of the height of the entire equipment.

The reference numerals enclosed above correspond to those used in embodiments described later.

BRIEF DESCRIPTION OF THE DRAWINGS

FIG. 15 is an illustrative view of a disposition relationship among the constituent members; wherein FIG. 15(a) shows a disposition relationship among a first arm, a second reinforce member, a third reinforce member, and a roller; FIG. 15(b) shows a disposition relationship of a first reinforce member; and FIG. 15(c) shows a disposition relationship of a second arm.

DETAILED DESCRIPTION OF THE INVENTION

Best Mode for Carrying Out the Invention

Referring now to the accompanying drawings, a description will be given with respect to embodiments of a height adjuster for a seat of a vehicle according to the present invention. In the following description, a backrest side of a vehicle seat is referred to as a backward direction, and a front end side of a seat cushion is referred to as a forward direction.

Figure 1:
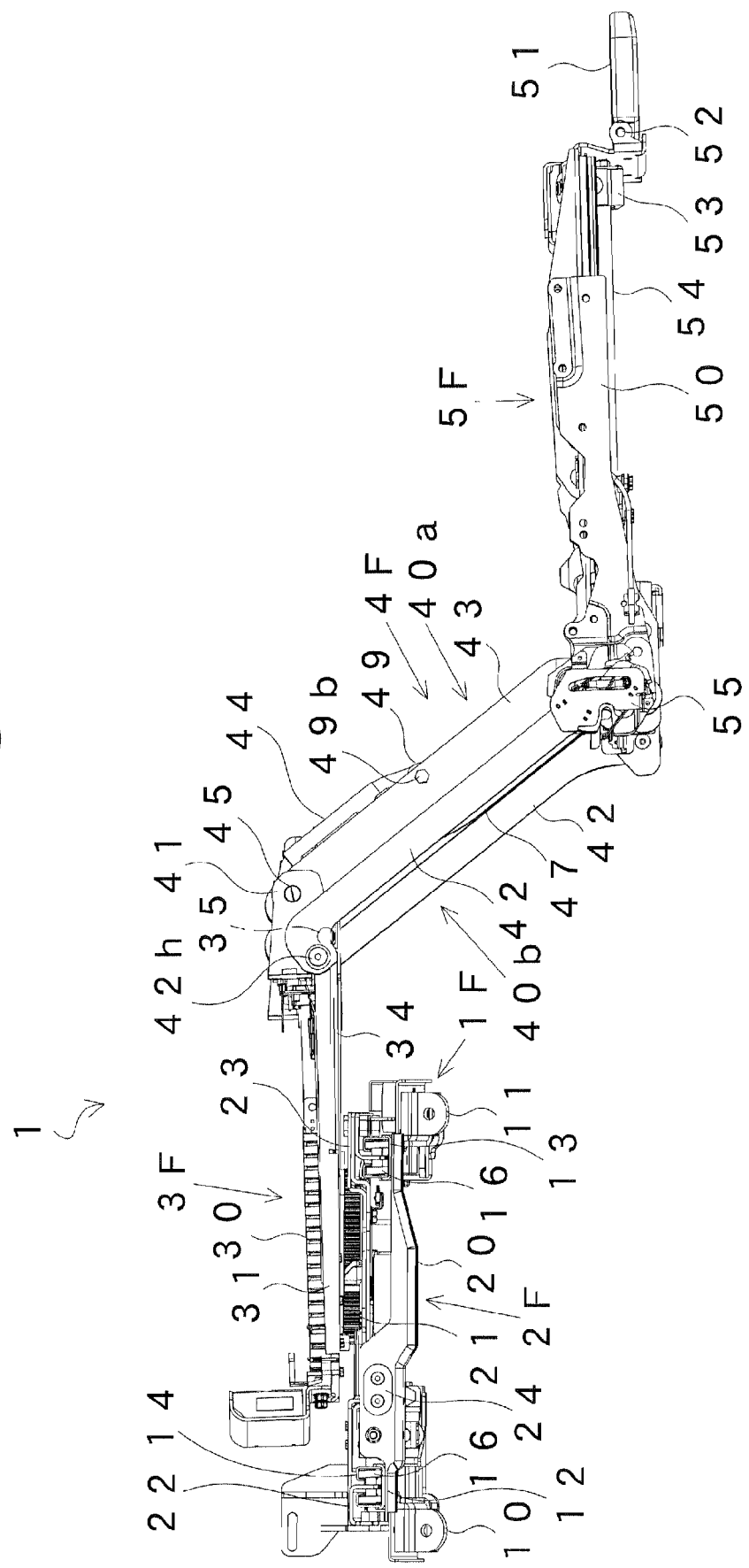
FIG. 1 is an illustrative left side view of a state in which a height adjuster for a seat of a vehicle according to an embodiment of the present invention is actuated, and then, the vehicle seat is lowered.
Figure 2:
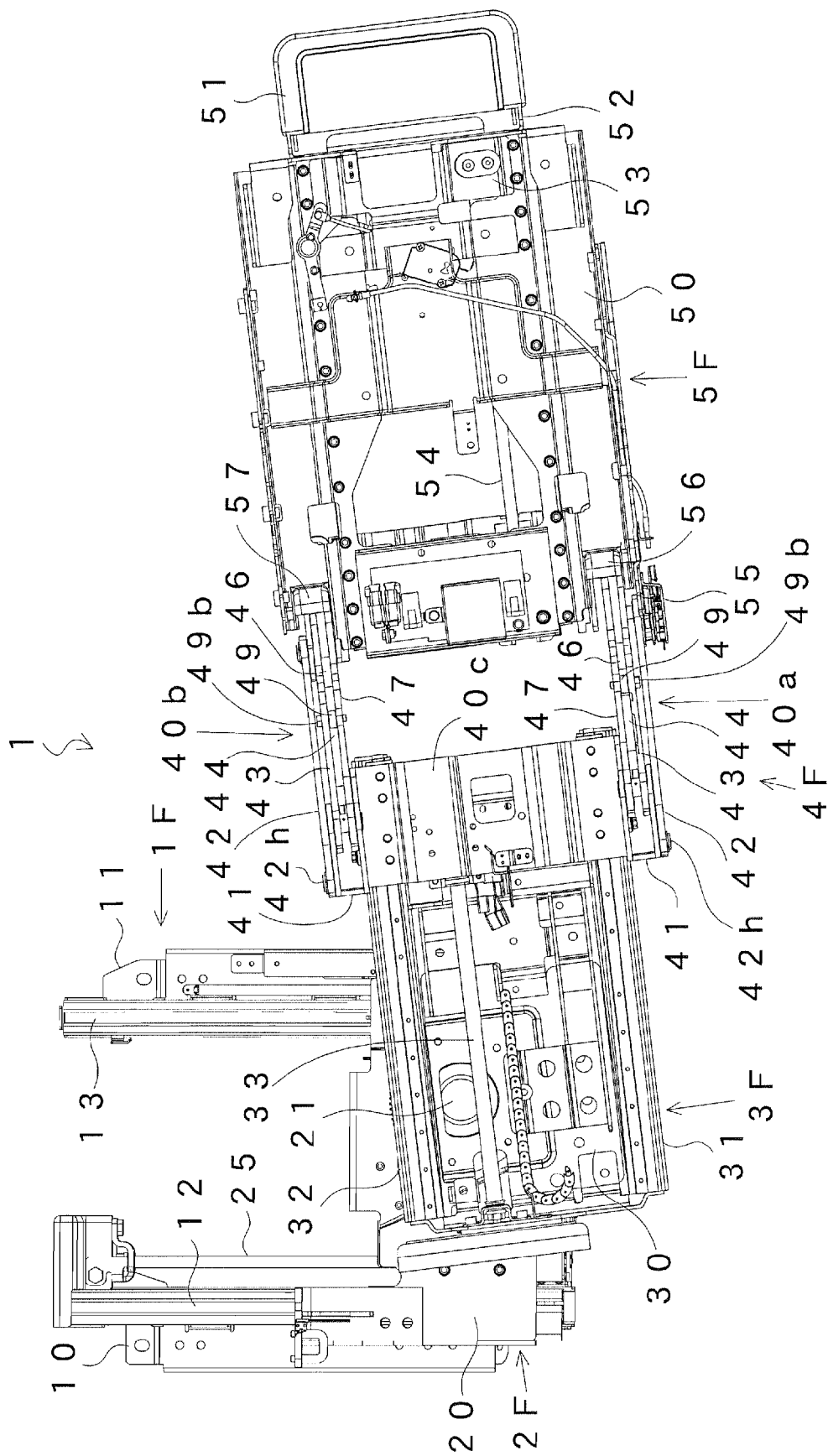
FIG. 2 is an illustrative top view of the height adjuster for a seat of a vehicle shown in FIG. 1.
Figure 3:
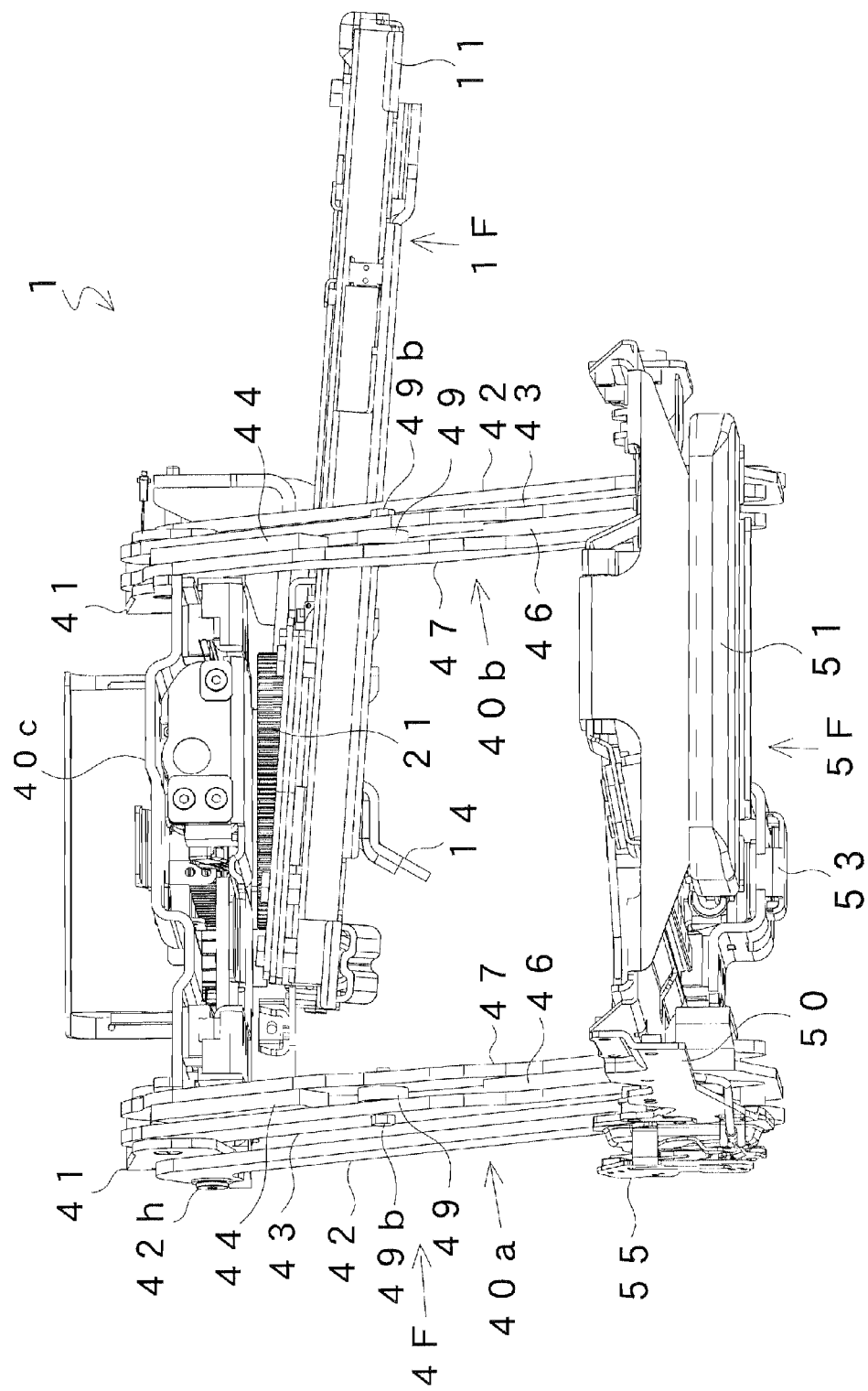
FIG. 3 is an illustrative front view of the height adjuster for a seat of a vehicle shown in FIG. 1.
Figure 4:
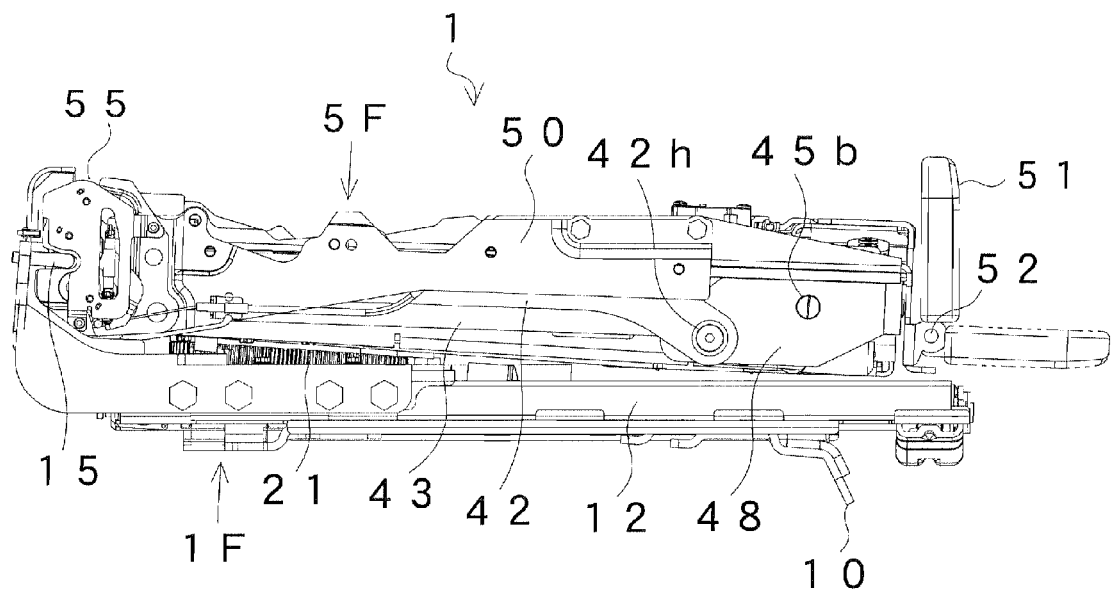
FIG. 4 is an illustrative view of the height adjuster for a seat of a vehicle before slid and lowered seen from the left side of a vehicle seat.
Figure 5:
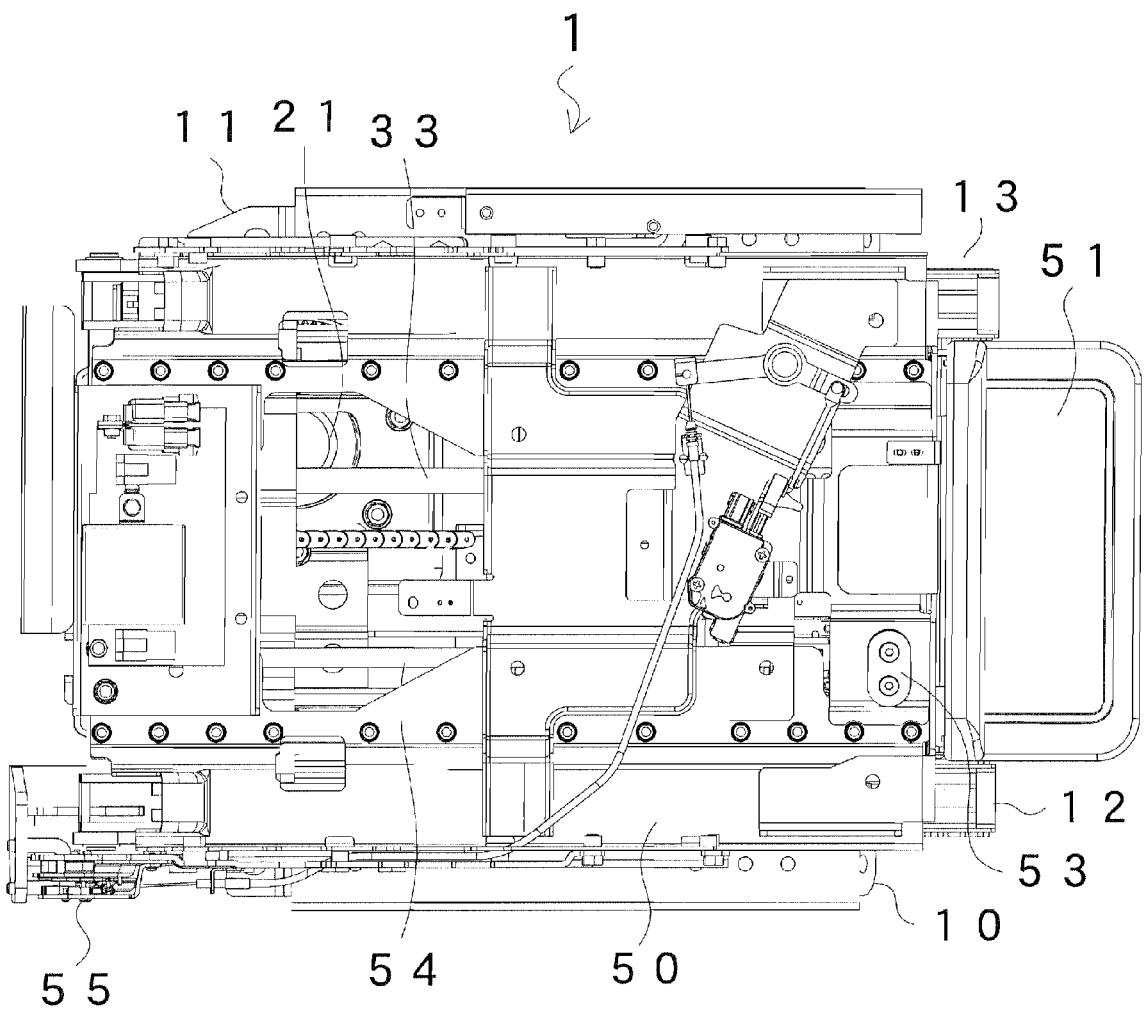
FIG. 5 is an illustrative top view of the height adjuster for a seat of a vehicle shown in FIG. 4.
Figure 6:
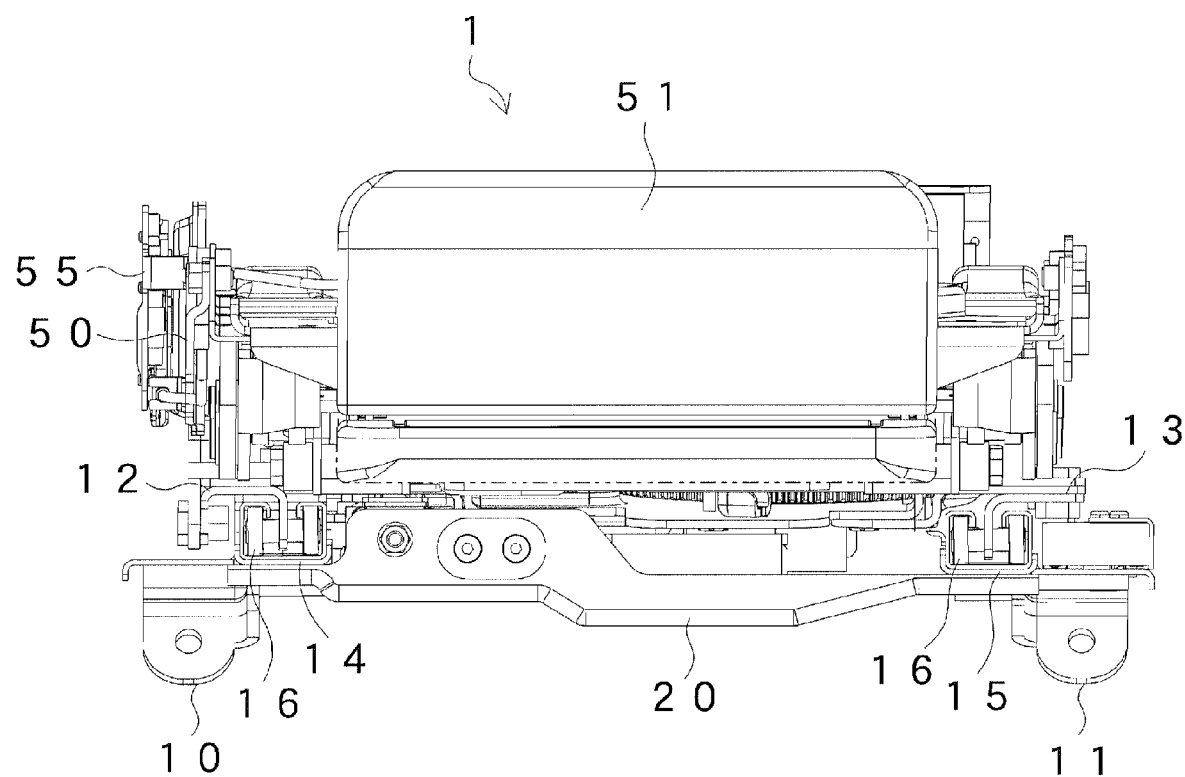
FIG. 6 is an illustrative front view of the height adjuster for a seat of a vehicle shown in FIG. 4.
Figure 7:
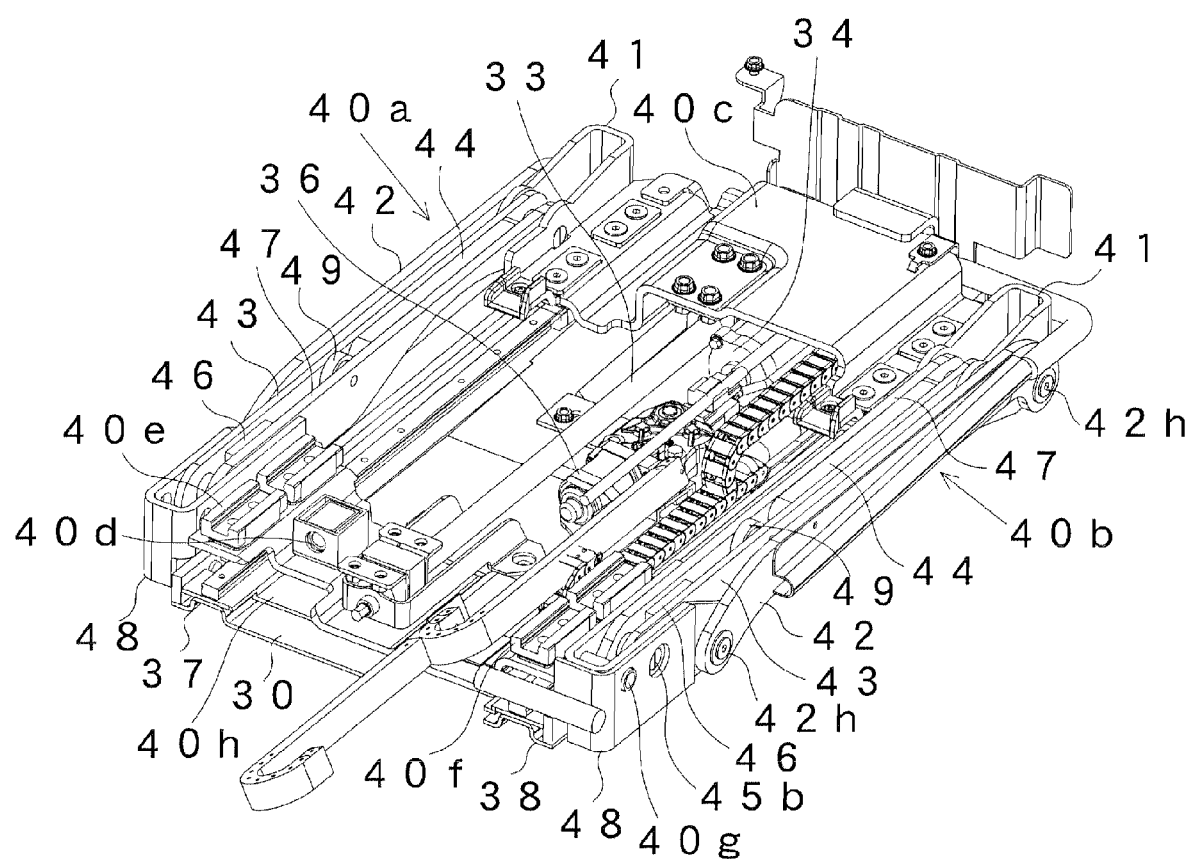
FIG. 7 is an illustrative front, oblique top right view of a state in which a fourth layer is laminated on a third layer that configures the height adjuster for a seat of a vehicle.
Figure 8:
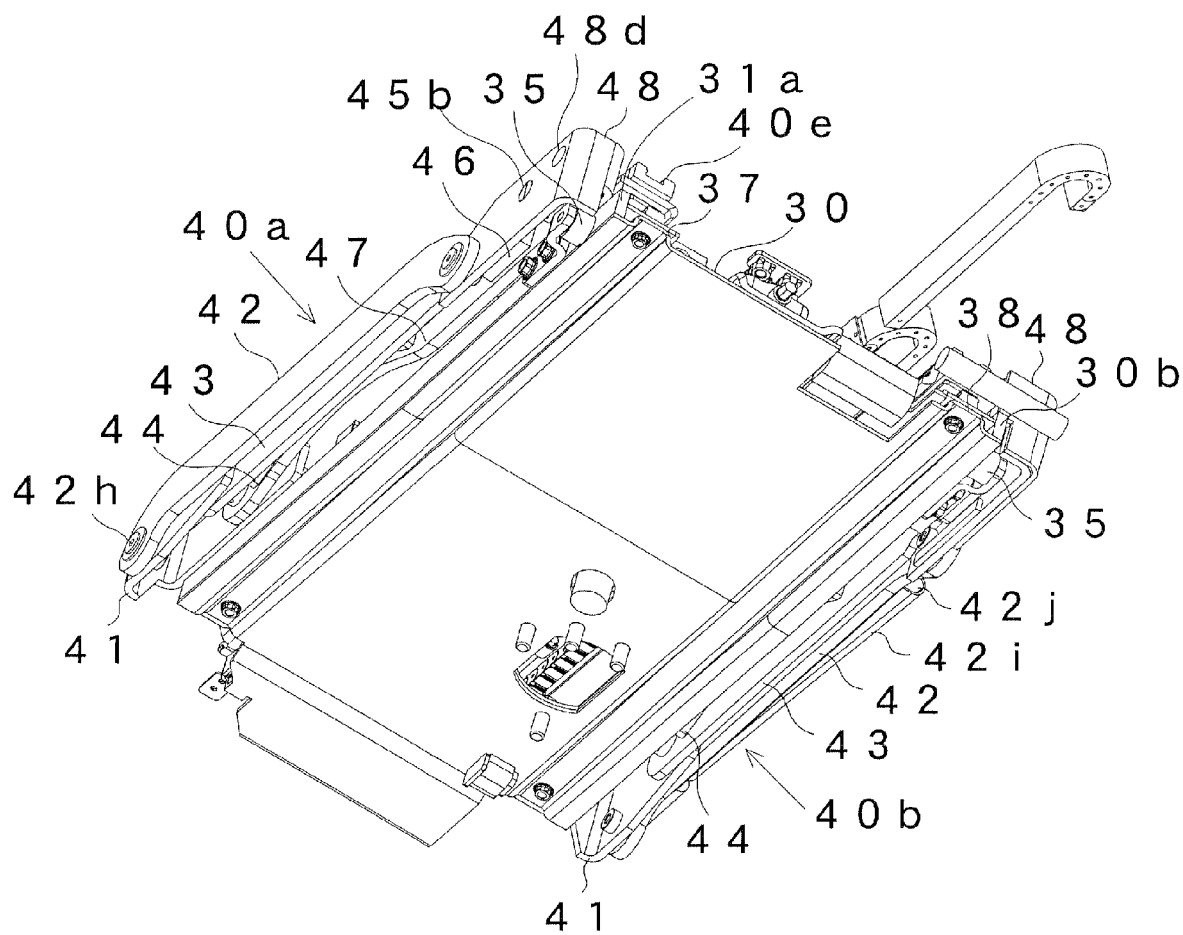
FIG. 8 is an illustrative front, oblique lower left view of the state of FIG. 7.
Figure 9:
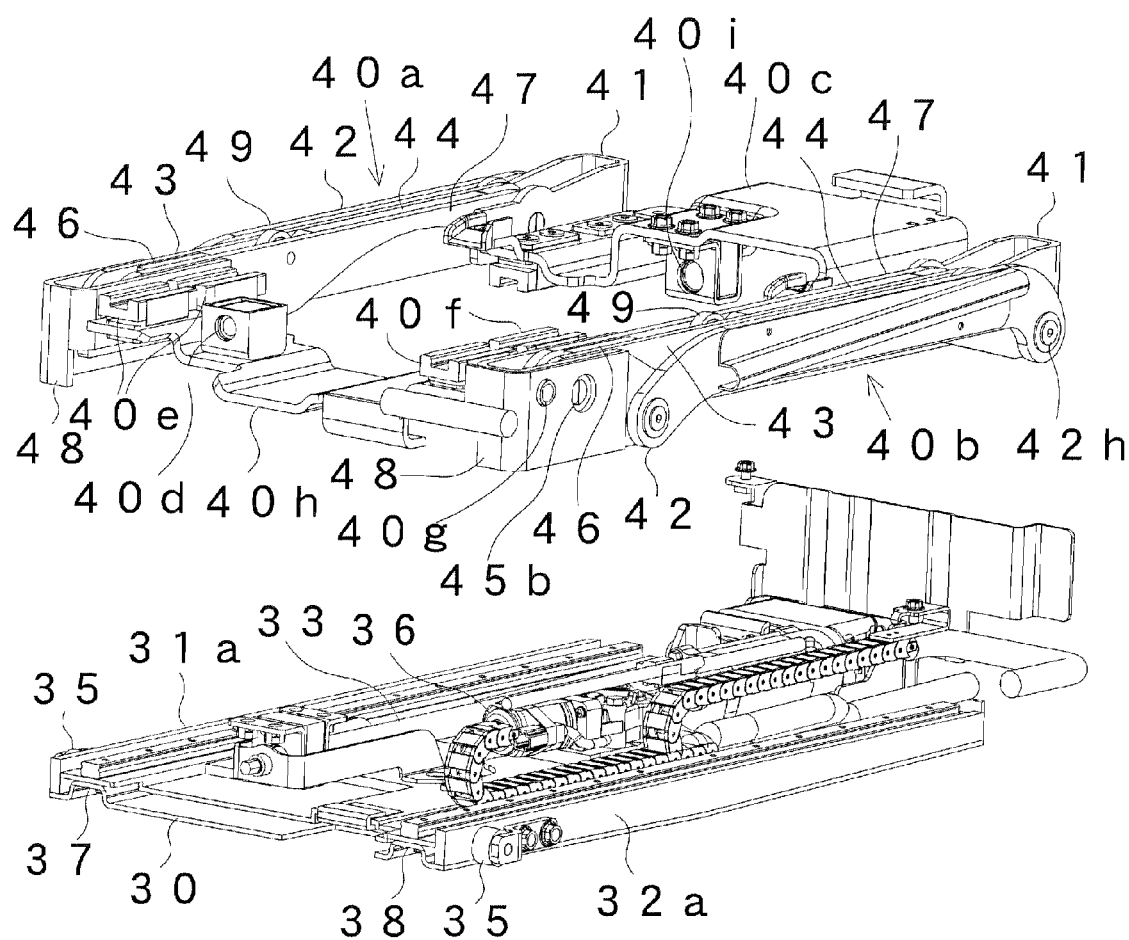
FIG. 9 is an illustrative view showing a state in which the third layer and the fourth layer shown in FIG. 7 are separated from each other.
Figure 10:
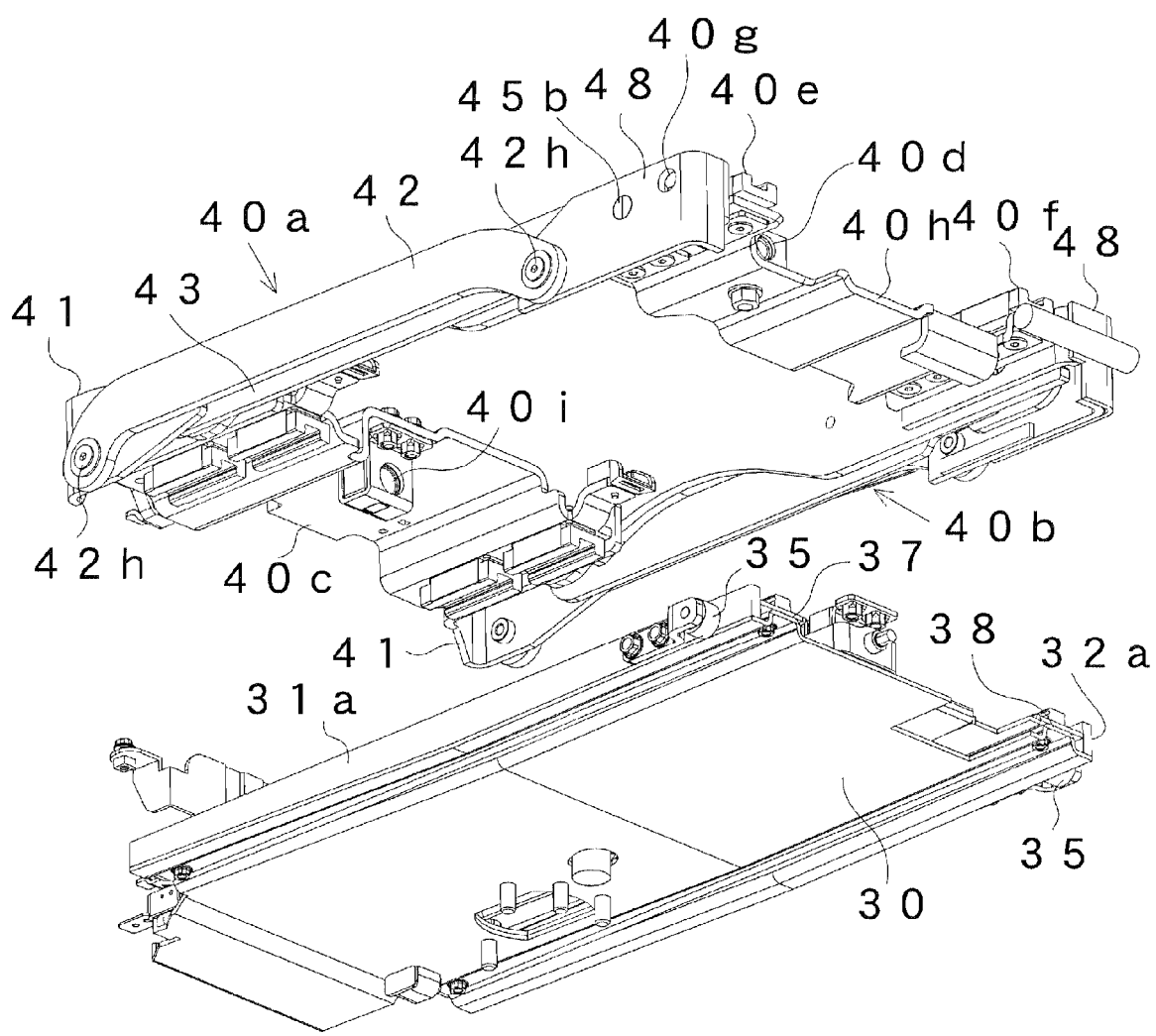
FIG. 10 is an illustrative front oblique lower left of the state of FIG. 9.

FIG. 1 to FIG. 3 are illustrative views each showing a state in which the height adjuster for a seat of a vehicle according to this embodiment is actuated, and then, the vehicle seat is lowered. FIG. 1 is an illustrative view seen from the left side of the vehicle seat; FIG. 2 is an illustrative top view; and FIG. 3 is an illustrative front view. FIG. 4 to FIG. 6 are illustrative views each showing a height adjuster for a seat of a vehicle before slid and lowered. FIG. 4 is an illustrative view seen from the left side of the vehicle seat; FIG. 5 is an illustrative top view; and FIG. 6 is an illustrative front view. FIG. 7 is an illustrative front oblique upper right view of a state in which a fourth layer is overlaid on a third layer that configures the height adjuster for a seat of a vehicle; and FIG. 8 is an illustrative front oblique lower left view of the state of FIG. 7. FIG. 9 is an illustrative view showing a state in which the third layer and the fourth layer shown in FIG. 7 are separated from each other, and FIG. 10 is an illustrative front oblique lower left view of the state of FIG. 9.

As shown in FIG. 1, a height adjuster for a seat of a vehicle 1 is configured in a fifth-layer structure made of a first layer 1F to a fifth layer 5F. Hereinafter, the structure of five layers will be described sequentially in order from the first layer. An access door (not shown) exists leftward of the vehicle seat mounted on the height adjuster for a seat of a vehicle 1.

[First Layer]

A first layer 1F is provided with: a pair of rail-shaped fixing members 10, 11 fixed to be opposed to each other to a vehicle floor; lower rails 12, 13 provided along each of the fixing members; and a plurality of rollers 16 (FIG. 1), each of which is disposed along the lower rail inside of each lower rail. In this embodiment, the fixing members 10, 11 each extend in the longitudinal direction of the vehicle.

[Second Layer]

A second layer 2F disposed on the first layer is provided with: upper rails 22, 23 (FIG. 1) that slide along the lower rail by means of rotation of a plurality of the rollers 16 disposed inside of each of the lower rails; a fixing member 20 fixed between the upper rails; a second layer sliding screw 25 (FIG. 2) disposed in parallel to the upper rail 22, for sliding the second layer 2F in the longitudinal direction; a first motor 24 (FIG. 1) for rotating this second-layer sliding screw 25; and a gear 21 (FIG. 2) mounted on the fixing member 20, the gear turnably supporting a third layer 3F.

[Third Layer]

A third layer 3F disposed on the second layer 2F is provided with: a pair of rails 31, 32 (FIG. 2) opposed to each other; a fixing member 30 fixed between the rails; a second motor 36 (FIG. 7, FIG. 9) mounted on this fixing member 30, the second motor rotating a gear 21 of the second layer 2F; a fourth-layer sliding screw 33 (FIG. 2, FIG. 5, FIG. 7, FIG. 9) for sliding a fourth layer 4F in the longitudinal direction; a third motor 34 (FIG. 7) for rotating this fourth-layer sliding screw 33; and guide rollers 35, 35 rotatably pivoted about outer side faces 31a, 32a (FIG. 8, FIG. 9, FIG. 10) of rails 31, 32. In each of the guide rollers 35, a turning center is set in a transverse direction, and an outer circumference is rotatable in the longitudinal direction. The outer circumference of each of the guide rollers 35 abuts with each of a first guide face 47d of a first arm 47 and a second guide face 44b of a second reinforce member 44 that configure the fourth layer F4, and then, relatively rolls along each of the guide faces.

[Fourth Layer]

A fourth layer 4F disposed on the third layer 3F is provided with a pair of link mechanisms 40a, 40b disposed to be opposed to each other. Between rear ends of each link mechanism, a fixing member 40c (FIG. 2, FIG. 3, FIG. 7, FIG. 9) is turnably pivoted with respect to a side face inside of each link mechanism, and then, a link portion 40i (FIG. 9, FIG. 10), with which the fourth-layer sliding screw 33 of the third layer 3F is threaded and coupled, is mounted on a back face of the fixing member 40c. Between front ends of each link mechanism, a fixing member 40h (FIG. 9, FIG. 10) is turnably pivoted with respect to a side face inside of each link mechanism, and then, a link portion 40d, with which a fifth-layer slide screw 54 (FIG. 2 FIG. 5) provided in a fifth layer 5F is threaded and coupled, is mounted on the fixing member 40h. In addition, rails 40e, 40f for slidably engaging in the longitudinal direction a guide member (not shown) provided on a lower face of each end of the fifth layer 5F sliding on the fourth layer 4F, are mounted, respectively, on a top face of each end of the fixing member 40h.

(Link Mechanism)

Referring now to FIG. 11 to FIG. 16, a description will be given with respect to a structure of each of link mechanisms 40a, 40b serving as features of the present invention.

Figure 11:
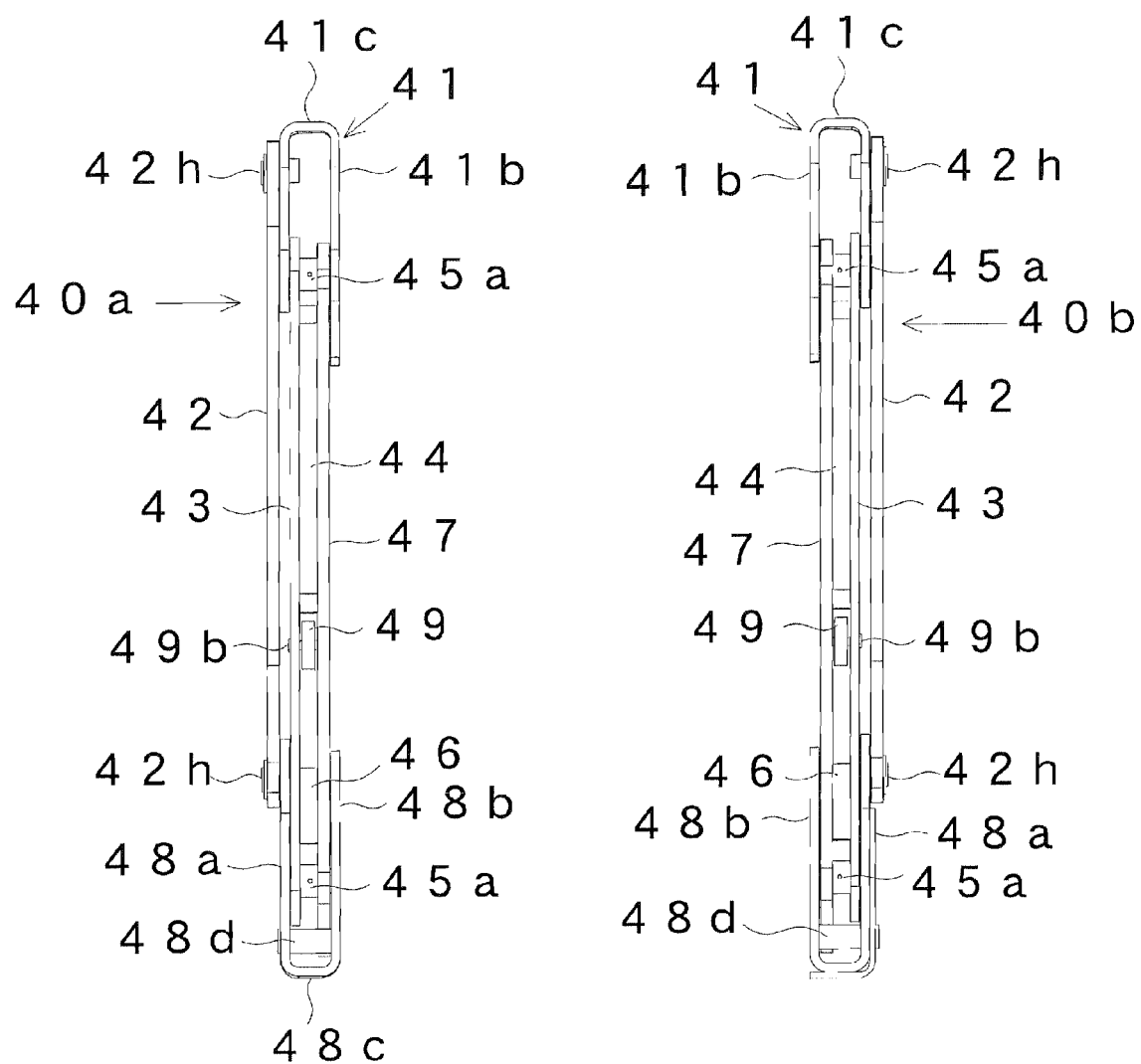
FIG. 11 is an illustrative top view of each link mechanism in an accommodated state.
Figure 12:
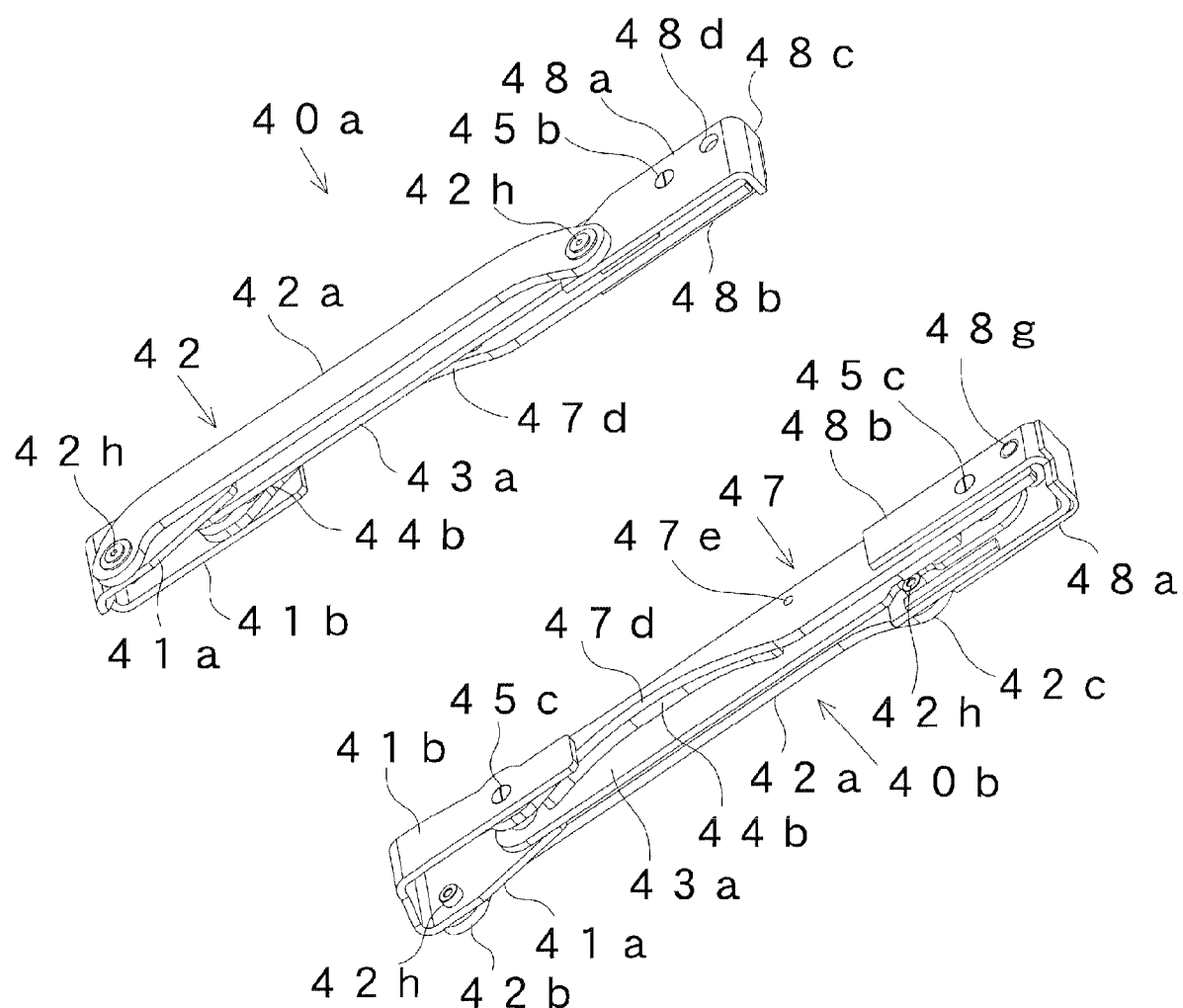
FIG. 12 is an illustrative front oblique lower left view of each link mechanism shown in FIG. 11.
Figure 13:
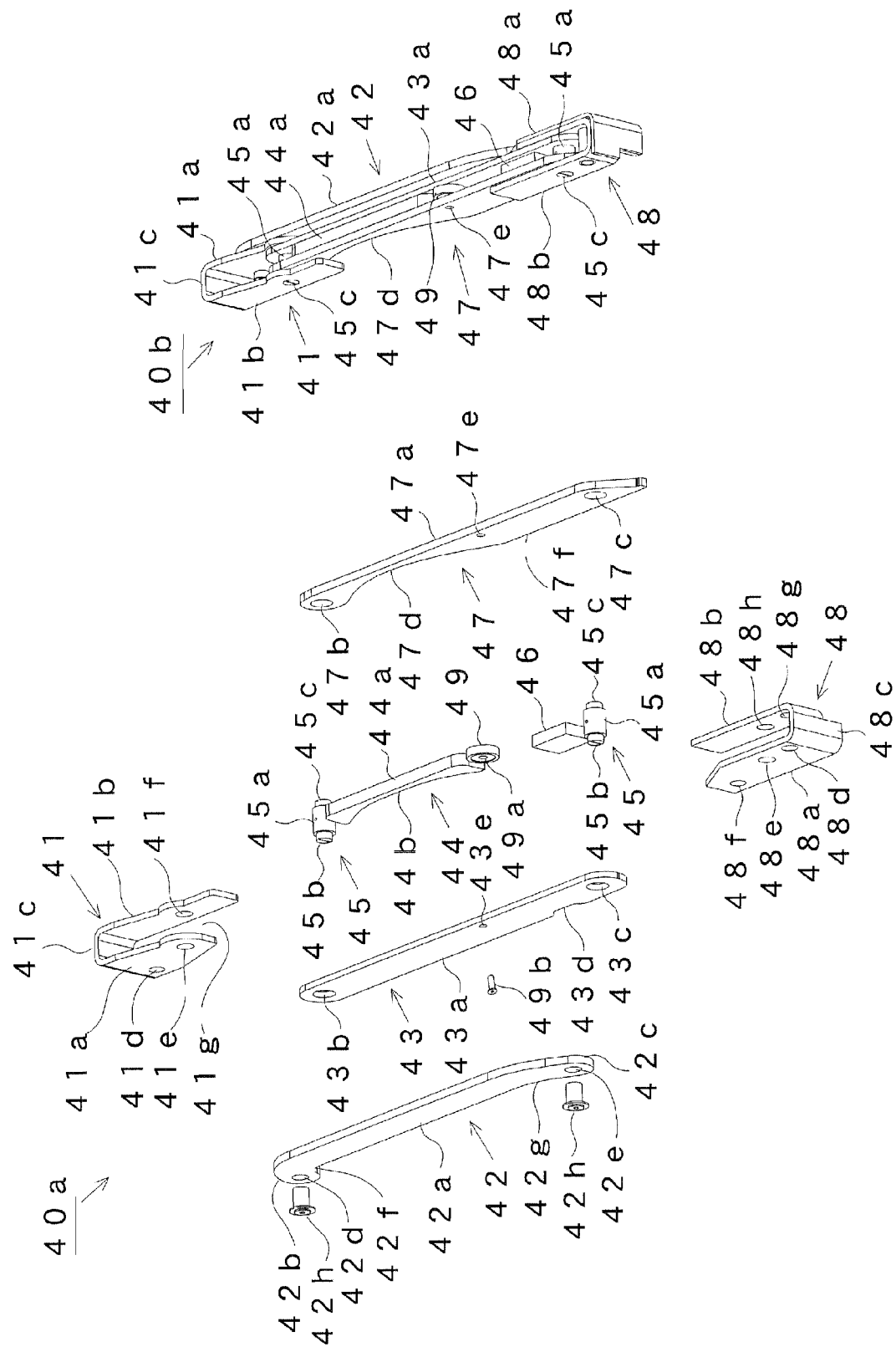
FIG. 13 is an exploded perspective view of a link mechanism 40a and an illustrative, oblique upper left view of a link mechanism 40b.
Figure 14:
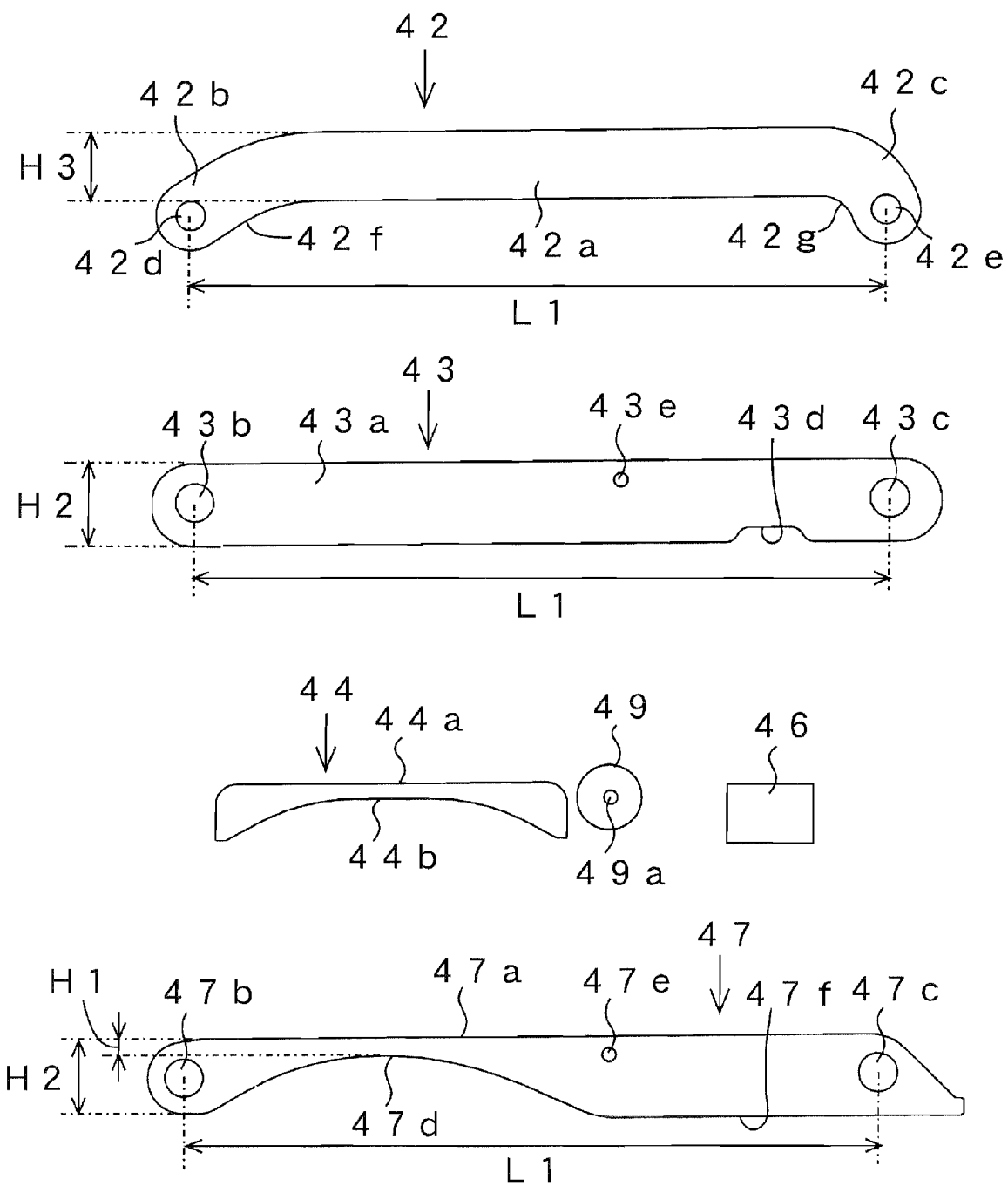
FIG. 14 is an illustrative view of constituent members of one link mechanism.
Figure 15:
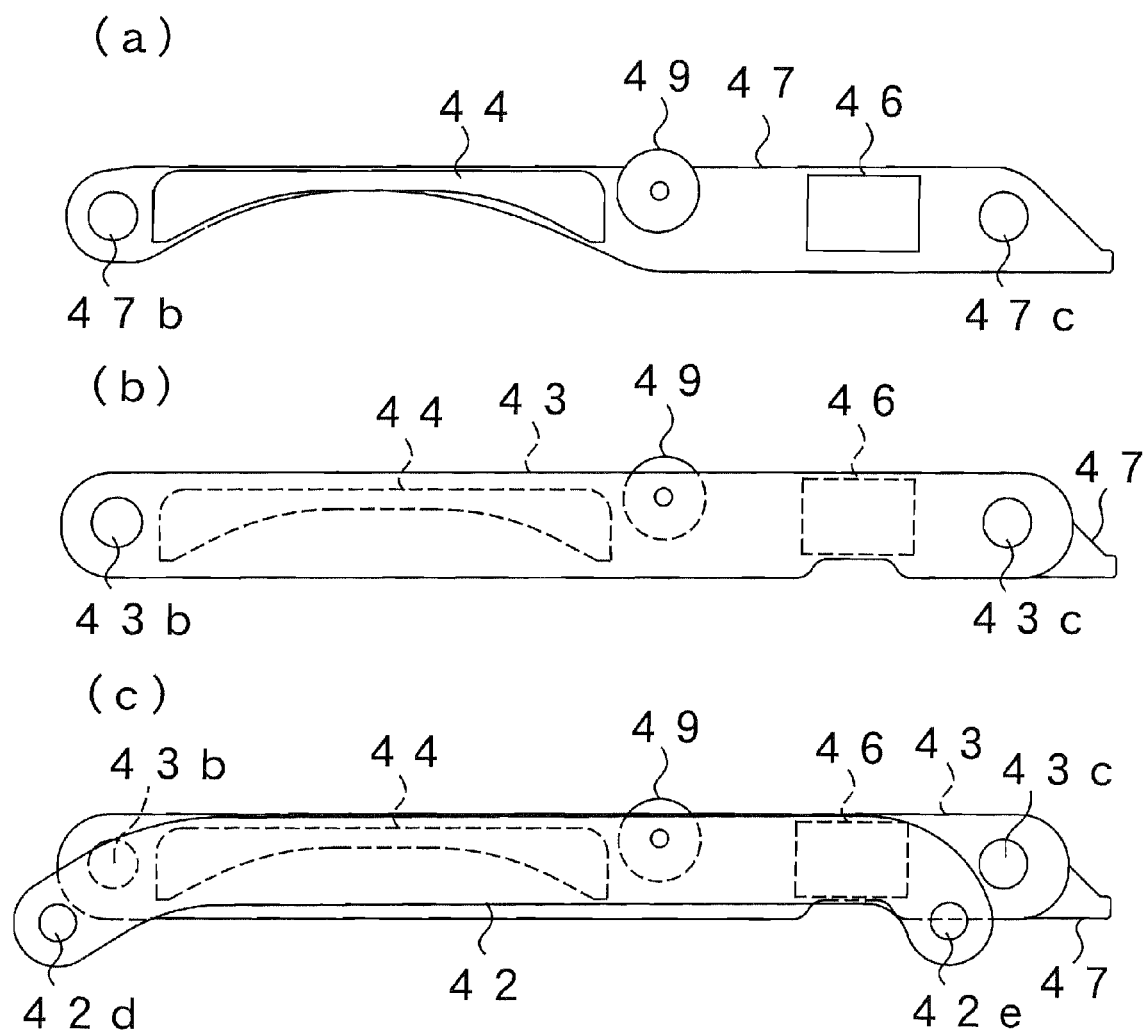
Figure 16:
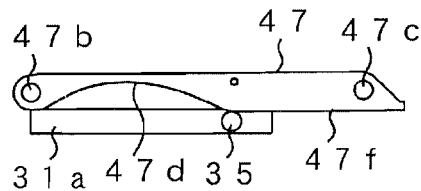
FIG. 16 is an illustrative view schematically depicting how the first arm is lowered along a guide roller.
Figure 16:
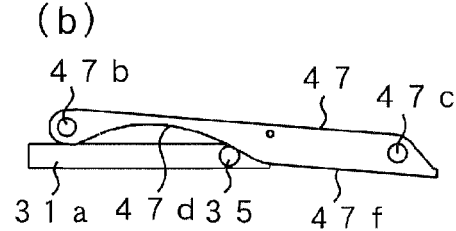
Figure 16:
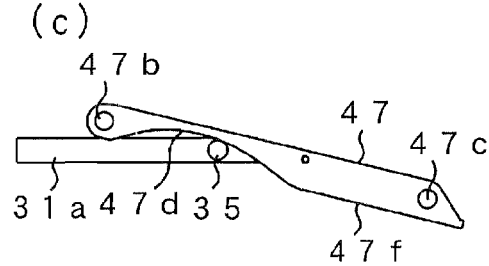
Figure 16:
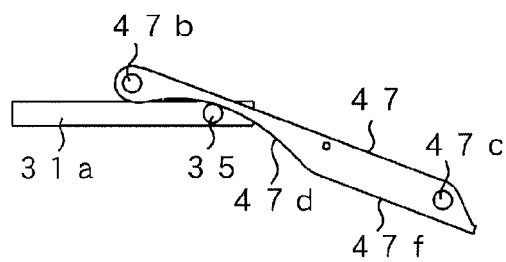
Figure 16:
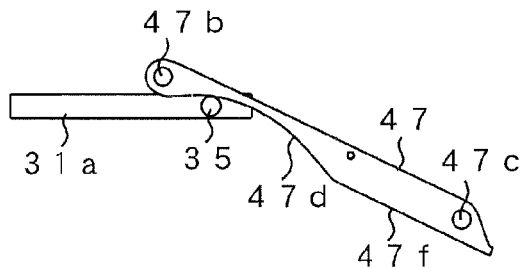

FIG. 11 is an illustrative top view of each of the link mechanisms in an accommodated state, and FIG. 12 is an illustrative front oblique lower left view of each of the link mechanisms shown in FIG. 11. FIG. 13 is an exploded perspective view of a link mechanism 40a and an illustrative oblique upper left view of a link mechanism 40b. FIG. 14 is an illustrative view of constituent members of one link mechanism. FIG. 15 is an illustrative view of a disposition relationship among constituent elements, wherein FIG. 15 (a) shows a disposition relationship among a first arm, a second reinforce member, a third reinforce member, and a roller; FIG. 15 (b) shows a disposition relationship of the first reinforce member; and FIG. 15 (c) shows a disposition relationship of a second arm. FIG. 16 is a schematic illustrative view of how the first arm is lowered along a guide roller.

As shown in FIG. 13, the link mechanisms 40a, 490b each are provided with: a first arm 47; a second arm 42; a first reinforce member 43; a second reinforce member 44; a third reinforce member 46; shaft members 45, 45; shaft members 42h, 42h; a first bearing 41; a second bearing 48; a roller 49; and a roller shaft member 49b, thereby configuring a four-joint link mechanism.

The first arm 47 is formed in an elongated plate shape in a longitudinal direction, an upper end face 47a thereof extends linearly in a longitudinal direction, and then, a first guide face 47d recessed toward the upper end face 47a is formed on a lower end face 47f.

A first guide face 47d is formed in a curved shape infralted toward the upper end face 47a, and then, a rotary face (outer circumference) of a guide roller 35 (FIG. 8, FIG. 9, FIG. 10) relatively rolls along the first guide face 47d in abutment with the first guide face 47d.

Namely, as shown in FIG. 16, the first arm 47 is lowered by relatively rolling of the guide roller 35 rotatably pivoted about the third layer 3F along the first guide face 47d, and thus, the trajectory depicted when the first arm 47 is lowered is determined depending on the shape of the first guide face 47d.

As shown in FIG. 14, a height H1 from an upper end face 47a to a first guide face 47d of a portion at which the first guide face 47d is formed, is formed to be lower than a height H2 from the upper end face 47a to a lower end face 47f of a portion at which the first guide face 47d is not formed. In other words, in the first arm 47, the thickness of a vertical direction of the portion at which the first guide face 47d is formed is not made equal to that of a vertical direction of the portion at which the first guide face 47d is not formed, or alternatively, is not increased any more, and then, the thickness of the vertical direction is decreased, whereby the first guide face 47d is formed.

On a plate face of a rear end of the first arm 47, a first shaft through hole 47b is formed to be penetrated in a transverse direction, and on a plate face of a front end, a third shaft through hole 47c is formed to be penetrated in a transverse direction.

The first reinforce member 43 is intended to compensate for the strength of the first arm 47, and then, is formed in an elongated plate shape in a longitudinal direction. On the plate face of the rear end of the first reinforce member 43, a first shaft through hole 43b is formed to be penetrated in a transverse direction, and, on the plate face of the front end, a third shaft through hole 43c is formed to be penetrated in a transverse direction.

As shown in FIG. 14, a distance from a center of the first shaft through hole 43b of the first reinforce member 43 to a center of the third shaft through hole 43c is equal to a distance L1 from a center of a first shaft through hole 47b of the first arm 47 to a center of the third shaft through hole 47c.

The second arm 42 is formed in an elongated plate shape in a longitudinal direction; a bent portion 42c bent obliquely downwardly is formed at a front end thereof, and a bent portion 42b bent obliquely downwardly is formed at a rear end thereof. Curved portions 42f, 42g are formed on lower end faces of the bent portions 42b, 42c, respectively, and a lower end face between curved portions extends linearly in a longitudinal direction.

On a plate face of a rear end of the second arm 42, a second shaft through hole 42d is formed to be penetrated in a transverse direction, and, on a plate face of a front end, a fourth shaft through hole 42e is formed to be penetrated in a transverse direction. A distance from a center of the second shaft through hole 42d of the second arm 42 to a center of a fourth shaft through hole 42e is equal to the distance L1 in the first arm 47 and the first reinforce member 43.

In addition, a height H3 from an upper end face to a lower end face of the second arm 42 is slightly lower than the height H2 in the first reinforce member 43.

The first bearing 41 turnably pivots the rear ends of the arms and reinforce members, and the second bearing 48 turnably pivots the front ends of the arms and reinforce members. In the present embodiment, the first bearing 41 and the second bearing 48 each are formed in a substantial sectional U shape. The bearing 41 is composed of: side plates 41a, 41b opposed each other; and a rear plate 41c formed between the rear ends of these side plates. On frontal plate faces of the side plates 41a, 41b, first bearing holes 41e, 41f for turnably pivoting the rear ends of the first arm 47 and the first reinforce member 43 are formed to be penetrated in the transverse direction.

In addition, on a plate face that is rear obliquely lower than the first bearing hole 41e of the side plate 41a, a second bearing hole 41d for turnably pivoting the rear end of the second arm 42 is formed to be penetrated in the transverse direction.

The second bearing 48 is composed of: side plates 48a, 48b opposed to each other; and a frontal plate 48c formed between the front ends of these side plates. On front plate faces of the side plates 48a, 48b, third bearing holes 48e, 48h for turnably pivoting the front ends of the first arm 47 and the first reinforce member 43 are formed to be penetrated in the transverse direction, respectively.

In addition, on a plate face that is rear obliquely lower than the third bearing hole 48e of the side plate 48a, a fourth bearing hole 48f for turnably pivoting the front end of the second arm 42 is formed to be penetrated in the transverse direction.

Further, on a plate face that is rather frontal than the third bearing holes 48e, 48h of the side plates 48a, 48b, fifth bearing holes 48d, 48g for turnably pivoting the second bearing 48 about a fixing member 40h (FIG. 9, FIG. 10) provided between link mechanisms are formed to be penetrated in the transverse direction, respectively.

Each bearing member 45 is composed of: a proximal portion 45a; a columnar shaft portion 45b formed to be protruded in a leftward direction from this proximal portion 45a; and a columnar shaft portion 45c formed to be penetrated in a right direction from the proximal portion 45a. Each shaft member 42h is formed in a columnar shape such that each head portion extends outwardly.

The rear ends of the first arm 47 and the first reinforce member 43 and one shaft member 45 are disposed between the side plates 41a and 41b of the first bearing 41, and the shaft portion 45b is inserted into the first bearing hole 41e of the side plate 41a through the first shaft through hole 43b of the first reinforce member 43. In addition, the shaft portion 45c is inserted into the first bearing hole 41f of the side plate 41b through the first shaft through hole 47b of the first arm 47.

Namely, the rear ends of the first arm 47 and the first reinforce member 43 are turnably disposed while the shaft portions 45b, 45c inserted into the first bearing holes 41e, 41f of the first bearing 41 are defined as a turning center.

The rear end of the second arm 42 is disposed outside of the side plate 41a of the first bearing 41, and one shaft member 42h is inserted into the second bearing hole 41d of the side plate 41a through the second shaft through hole 42d of the second arm 42.

Namely, the rear end of the second arm 42 is turnably disposed while the shaft member 42h inserted into the second bearing hole 41d of the first bearing 41 is defined as a turning center.

The front ends of the first arm 47 and the first reinforce member 43 and the other shaft member 45 are disposed between the side plates 48a and 48b of the second bearing 48, and the shaft portion 45b is inserted into the third bearing hole 48e of the side plate 48a through the third shaft through hole 43c of the first reinforce member 43. In addition, the shaft portion 45c is inserted into the third bearing hole 48h of the side plate 48b through the third shaft through hole 47c of the first arm 47.

Namely, the front ends of the first arm 47 and the first reinforce member 43 are turnably disposed while the shaft portions 45b, 45c inserted into the third bearing holes 48e, 48h of the second bearing 48 each are defined as a turning center.

The front end of the second arm 42 is disposed outside of the side plate 48a of the second bearing 48, and the other shaft member 42h is inserted into a fourth bearing hole 48f of the side plate 48a through a fourth shaft through hole 42e of the second arm 42.

Namely, the front end of the second arm 42 is turnably disposed while the shaft member 42h inserted into a fourth bearing hole 48f of the second bearing 48 is defined as a turning center.

On the plate faces close to the upper end faces of the first reinforce member 43 and the first arm 47, roller bearing holes 43e for inserting a roller shaft member 49b are formed to be penetrated in the transverse direction, respectively. At the rotation center of the roller 49, a shaft through hole 49a for inserting a roller shaft member 49b is formed to be penetrated in the transverse direction.

The roller 49 is disposed between the first arm 47 and the first reinforce member 43, and the roller shaft member 49b is inserted into the roller bearing hole 47e of the first arm 47 through the roller bearing hole 43e of the first reinforce member 43 and the shaft through hole 49a of the roller 49.

Namely, the roller 49 is turnably disposed in the longitudinal direction while the roller shaft member 49b is defined as a rotational center between the first arm 47 and the first reinforce member 43.

A space is formed between the first arm 47 and the first reinforce member 43, and a second reinforce member 44 is disposed between a shaft member 45 and the roller 49 that are disposed rearward. An upper end face of the second reinforce member 44 extends in the longitudinal direction in the same manner as that of the first arm 47, and a second guide face 44b formed in the same shape as that of the first guide face 47d of the first arm 47 is formed on a lower end face. The second reinforce member 44 is fixed to the inside plate faces of the first arm 47 and the first reinforce member 43 by means of welding or the like in a state in which the second guide face 44b is aligned with the first guide face 47d of the first arm 47 when viewed from the side face.

A space is formed between the first arm 47 and the first reinforce member 43, and a third reinforce member 46 is disposed between a shaft member 45 and a roller 49 that are disposed forward. In the present embodiment, the third reinforce member 46 is formed in a plate shape having a height that does not overlap from the upper end faces and lower end faces of the first arm 47 and the first reinforce member 43, and is fixed by means of welding or the like to the inside plate faces of the first arm 47 and the first reinforce member 43.

In a state in which a fourth layer 4F has been disposed on a third layer 3F, the first arm 47, the second arm 42, and the first reinforce member 43 that configure a link mechanism provided in the fourth layer 4F are formed in a shape such that the upper end faces are aligned with each other, and a part of a rotational face (outer circumference) of the roller 49 is formed in a shape such that it is protruded from each of the upper end faces described above.

The second arm 42, the first reinforce member 43, the second reinforce member 44, and the first arm 47 are sequentially disposed from the outside in each of the link mechanisms 40a, 40b. As shown in FIG. 15 (c), in a state in which the fourth layer 4F is laminated on the third layer 3F, the first arm 47, the second arm 42, and the first reinforce member 43 of the link mechanism that configures the fourth layer 4F are set at the same height. The height of each of the second reinforce member 44 and the third reinforce member 46 is set to be lower than that of each of the arms and that of the first reinforce member 43.

A shaft member 40g is inserted into fifth shaft bearing holes 48d, 48g of a second bearing 48 of each of the link mechanisms, and the shaft member 40g is turnably pivoted about a side face of a fixing member 40h that is further disposed between the link mechanisms.

Namely, each of the second bearings 48 is turnably pivoted about the fixing member 40h. As shown in FIG. 1, when each link mechanism is lowered, a fifth layer 5F held on the fixing member 40h can be maintained at a horizontal posture.

In addition, the first bearings 41 are fixed to both side faces of the fixing member 40c disposed between the link mechanisms. As shown in FIG. 3, when each of the link mechanisms is lowered, such each link mechanism remains on the third layer 3F.

[Fifth Layer]

The fifth layer 5F disposed on the fourth layer 4F is provided with a fixing member 50 for fixing a seat cushion of a vehicle seat (not shown); rotational faces of rollers 49, 49 disposed in each of the link mechanism of the fourth layer 4F abut with back faces at both sides of the fixing member 50, respectively, and relatively roll along its back face. Namely, the fifth layer 5F moves in the longitudinal direction on the fourth layer 4F due to rolling of the rollers 49, 49. In addition, the step 51 for loading legs of a rider who is sitting at a vehicle seat is disposed at the front end of the fixing member 50; both sides of the rear end of the step 51 are turnably pivoted about the front end of the fixing member 50 by means of a turning shaft portion 52, respectively, and, in the step 51, its front end is turnable backwardly while the turning shaft portion 52 is defined as a turning shaft (FIG. 4).

A fifth-layer sliding screw 54 extending in the longitudinal direction and a fourth motor 53 for rotating this fifth-layer sliding screw 54 are disposed on a back face of the fixing member 50. A link portion 40d provided in the fourth layer 4F is threaded at the rear end of the fifth-layer sliding screw 54.

When the fifth-layer sliding screw 54 is rotated by means of driving of the fourth motor, the fifth layer 5F slides in the longitudinal direction. At this time, both ends of the back face of the fixing member 50 of the fifth layer 5F are established in a state in which they are supported on the rotational faces of the rollers 49, 49 disposed in the link mechanisms 40a, 40b, respectively. The fifth layer 5F can slide smoothly when it slides in the longitudinal direction because each of the rollers 49 rotates.

A lock mechanism 55 for locking the fifth layer 5F with the first layer 1F is mounted on one side of the rear end of the fifth layer 5F. As shown in FIG. 4, in a state in which each layer stops at a predetermined position before operation, the lock mechanism 55 is engaged with a striker 15 mounted on the rear end of the first layer 1F, and is locked so that the fifth layer 5F does not slide forward on the fourth layer 4F.

DESCRIPTION OF OPERATION

Now, a description will be given with respect to an operation of a height adjuster for a seat of a vehicle according to the present embodiment.

A height adjuster for a seat of a vehicle 1 before operation is established in a state in which a first layer 1F serving as the lowest layer to a fifth layer serving as the top layer are laminated, as shown in FIG. 4. In this state, as shown in FIG. 15(c), a height of a first arm 47 provided in each of link mechanisms 40a, 40b of a fourth layer 4F is restrained to be equal to that of each of a second arm 42 and a first reinforce member 43, and does not protrude upwardly. Thus, the full height of the height adjuster for a seat of a vehicle 1 can be restrained.

When a down switch (not shown) for lowering the height adjuster for a seat of a vehicle 1 is turned ON, a device (not shown) for unlocking a lock mechanism 55 is actuated, and then, the lock mechanism 55 and a striker 15 are disengaged from each other.

Then, a first motor 24 (FIG. 1) provided in a second layer 2F rotates, a second-layer sliding screw 25 (FIG. 2) rotates, and then, a second layer 2F slides forwardly in a state in which a third layer 3F to a fifth layer 5F are laminated on the second layer 2F.

When the second layer 2F advances up to a predetermined position, a second motor 36 ((FIG. 7, FIG. 9) provided in a third later 3F rotates. A gear 21 (FIG. 2, FIG. 3) provided in the second layer 2F rotates, and then, the third layer 3F swivels leftward in a state in which the fourth layer 4F and the fifth layer 5F are laminated on the third layer 3F (FIG. 2). In this manner, a rider who is sitting at a vehicle seat is in a posture in which the rider sits in opposite to a door opening.

Subsequently, a fourth motor 53 (FIG. 2) provided in the fifth layer 5F rotates, and then, a fifth-layer sliding screw 54 (FIG. 2) rotates. Then, the fifth layer 5F slides toward the door opening on the fourth layer 4F, and then, protrudes from the door opening to the outside of a vehicle. At this time, the first layer 5F advances while rotating rollers 49, 49 provided in each of the link mechanisms 40a, 40b of the fourth layer 4F and in abutment with a back face of the fifth layer 5F. Thus, less-frictional, smooth sliding is provided.

When the fifth layer 5F advances up to a predetermined position, a third motor 34 (FIG. 7) provided in the fourth layer 4F rotates. Then, a fourth-layer sliding screw 33 (FIG. 2, FIG. 5, FIG. 7, FIG. 9) rotates, and then, the fourth layer 4F slides toward the door opening on the third layer 3F.

As shown in FIG. 16 (b), before the fourth layer 4F advances, a lower end face 47f of each of first arms 47 of each of link mechanisms 40a, 40b is established in a state in which the lower end face is supported on a rotational face (circumferential face) of a guide roller 35 pivoted about a side face of the third layer 3F. Then, when advancement of the fourth layer 4F is started, then, as shown in FIG. 16 (*b*), the guide roller 35 relatively rolls along a first guide face 47*d* of the first arm 47, and then, a front end of the first arm 47 starts lowering. When the fourth layer 4F further advances, as shown in FIG. 16 (*c*) to FIG. 16 (*e*), the guide roller 35 rolls backward along a curve of the first guide face 47*d*, and then, the front end of the first arm 47 is further lowered.

Namely, the fourth layer 4F is lowered while depicting the trajectory that corresponds to the curve of the first guide face 47*d*.

When the front end of each of the link mechanisms 40*a*, 40*b* is lowered, the fifth layer 5F pivoted about the front end of each of the link mechanisms is also lowered together with the lowering of the fourth layer 4F while a horizontal posture is maintained. Thus, a person who is sitting at a vehicle seat mounted on the fifth layer 5F is lowered in a state in which a posture before this equipment operates is maintained. In addition, when the lowering of the fourth layer 4F terminates, the fifth layer 5F is lowered to a predetermined height from the ground level outward of the door opening.

In the meantime, the second arm 42 and the first reinforce member 43 of each of the link mechanisms turn in accordance with movement of the first arm 47, and then, their respective front ends are lowered. When each of the link mechanisms 40*a*, 40*b* is lowered, a load is applied due to the fifth layer 5F mounted on the front end of each of the link mechanisms, due to the vehicle seat mounted on the fifth layer 5F, and due to a rider who is sitting at the vehicle seat. Although a portion at which the first guide face 47*d* of the first arm 47 is formed is smaller in thickness of a vertical direction than a portion at which the first guide face 47*d* is not formed, and strength is lowered, the first arm 47 and the first reinforce member 43 of which turning shafts of the front end and the rear end are made identical to each other, are provided. The load described above is also applied to the first reinforce member 43, and then, the load on the first arm 47 is dispersed, thus making it possible to compensate for insufficient strength of the first arm 47.

Further, between the first arm 47 and the first reinforce member 43 and at a site corresponding to the first guide face 47*d* of the first arm 47, a second reinforce member 44 is fixed to the first arm 47 and the first reinforce member 43, and then, the guide roller 35 also rolls a second guide face 44*b* of the second reinforce member 44 (FIG. 13). In this manner, when the first arm 47 is lowered while the arm 47 is supported on a rotational face of the guide roller 35, a load on the first arm 47 is dispersed by means of the second reinforce member 44, thus making it possible to compensate for insufficient strength of the first arm 47 more rigidly. Further, between the first arm 47 and the first reinforce member 43 and in front of the second reinforce member 44, the third reinforce member 46 is fixed to the first arm 47 and the first reinforce member 43, thus making it possible to compensate for insufficient strength of the first arm 47 further rigidly.

In addition, when an UP switch (not shown) is turned ON, the switch being operated to restore the vehicle seat lowered up to the vicinity of the ground outward of the door opening to the vehicle internal fixing position, a third motor 34 (FIG. 7) provided in the fourth layer 4F rotates in a direction opposite to that at the time of lowering; the fourth-layer sliding screw 33 (FIG. 2, FIG. 5, FIG. 7, FIG. 9) rotates in a direction opposite to that at the time of lowering; and the fourth layer 4F slides toward the rear part of the third layer 3F. At this time, each of the first arms 47, with which each of the link mechanisms 40*a*, 40*b* is provided, makes movement reversed from that at the time of lowering shown in FIG. 16 (movement reversed from FIG. 16 (*e*) to FIG. 16 (*a*)). At this time as well, a load on each of the first arms 47 is dispersed due to the first reinforce member 43, the second reinforce member 44, and the third reinforce member 46, thus making it possible to compensate for insufficient strength of each of the first arms 47 rigidly.

The vehicle seat mounted on the fifth layer 5F rises in a state in which a horizontal posture is maintained at the time of rise of the fourth layer 4F in the same manner as that at the time of lowering. When the fourth layer 4F is retracted up to a predetermined position of the third layer 3F, a fourth motor 53 (FIG. 2) provided in the fifth layer 5F rotates in a direction opposite to that at the time of lowering; a fifth-layer sliding screw 54 (FIG. 2) rotates in a direction opposite to that at the time of lowering; and then, the fifth layer 5F retracts on the fourth layer 4F.

Then, a second motor 36 (FIG. 7, FIG. 9) provided in the third layer 3F rotates in a direction opposite to that at the time of left swiveling; a gear 21 (FIG. 2, FIG. 3) provided in the second layer 2F rotates in a direction opposite to that at the time of left swiveling; and the third layer 3F swivels rightward in a state in which the fourth layer 4F and the fifth layer 5F are laminated on the third layer. In this manner, a rider who is sitting at the vehicle seat is in a posture at which the rider is sitting forward of the vehicle.

Subsequently, the first motor 24 (FIG. 1) provided in the second layer 2F rotates in a direction opposite to that at the time of advancement; a second-layer sliding screw 25 (FIG. 2) rotates in a direction opposite to that at the time of advancement; and then, the second layer 2F slides backwardly in a state in which the third layer 3F to the fifth layer 5F are laminated on the second layer 2F. When the second layer 2F retracts up to a predetermined position, the lock mechanism 55 of the fifth layer 5F is engaged with the striker 15 of the first layer 1F; and the fifth layer 5F is locked with the first layer 1F, and then, sliding is disabled.

ADVANTAGEOUS EFFECT OF THE EMBODIMENTS (1) When implementing a height adjuster for a seat of a vehicle 1 according to the embodiments described above, a planer first reinforce member 43 is provided for compensating for a first arm 47. Thus, the lowered strength of the first arm 47 due to the step of low forming a height H1 from an upper end face 47*a* of the first arm 47 up to a first guide face 47*d* can be compensated for by means of the first reinforce member 43.

Therefore, even if a height H2 is not increased from the upper end face 47*a* to a lower end face 47*f* of a portion at which a first guide face 47*d* is not formed, the first guide face 47*d* can be formed. Thus, the height of the height adjuster for a seat of a vehicle 1 can be lowered in a state in which each of the link mechanisms 40*a*, 40*b* is accommodated between the third layer 3F and the fifth layer 5F.

(2) Moreover, a second reinforce member 44 having a second guide face 44*b* that is formed in the same shape as that of the first guide face 47*d* is fixed between the first arm 47 and the first reinforce member 43 of each of the link mechanisms 40*a*, 40*b*, thus making it possible to enhance the strength of the first arm 47 more significantly.

(3) In addition, in a height adjuster for a seat of a vehicle provided with a slide device and a swivel device, there is a tendency that a height of entire equipment is greater than that in the case where such equipment is not provided. Thus, restriction on the height of the entire equipment is strongly demanded. However, with the height adjuster for a seat of a vehicle 1 according to the embodiments described above, the height of each of the link mechanisms 40a, 40b can be restrained, thus making it possible to contribute to restriction on the height of the entire equipment.

Other Embodiments (1) A first reinforce member 43, a second reinforce member 44, and a third reinforce member 46 may be formed in a rod shape or a columnar shape other than a planar shape.

(2) The first reinforce member 43 may be configured to be formed in the same shape as that of a first arm 47 to dispose a guide roller 35 at a position that corresponds to a guide face formed at the first reinforce member 43. In this case, a length in a transverse direction on a circumferential face of the guide roller 35 is obtained as a distance between guide faces formed at least at the first arm 47 and the first reinforce member 43, respectively. In addition, the guide roller 35 that relatively rolls the guide face of the second reinforce member 44 may be provided coaxially to the guide roller 35 according to the embodiments described above.

In the case where these configurations have been employed, a load on the first guide face 47d of the first arm 47 is dispersed onto a guide face of the first reinforce member 43 other than a second guide face 44b of the second reinforce member 44, thereby making it possible to rigidly compensate for insufficient strength of the first arm 47.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A height adjuster for a seat of a vehicle, comprising:
    a support base placed in a vehicle;
    a mount base slidably disposed over the support base, the mount base mounting a seat portion of the vehicle seat; and
    first and second link mechanisms disposed between the support base and the mount base, the link mechanisms being opposed to each other to link the support base and the mount base,
    said link mechanisms each being configured to lower the mount base that slides toward a door opening over the support base to an outside of a vehicle that is lower than an inside of the vehicle via the door opening from an upside of the support base and to raise the mount base that has lowered to the outside of the vehicle to a position before lowered,
    wherein rotatably pivoted rotational members are provided at both sides of end parts at a door opening side of the support base in a state in which the mount base can slide toward the door opening,
    each of the link mechanisms is provided with:
        first and second turning shafts turnably pivoted about the support base;
        third and fourth turning shafts turnably pivoted about the mount base;
        a first planar member of which a plate face of one end and a plate face of the other end are turnably pivoted about the first turning shaft and about the third turning shaft, respectively, a first guide face formed in a curved shape in which the rotational member relatively rolls is formed to be recessed from a lower end face toward an upper end face, and further, a height from the upper end face of a portion at which the first guide face is formed up to the first guide face is formed to be lower than a height from the upper end face to the lower end face of a portion at which the first guide face is not formed;
        a first planar reinforcement member of which a plate face of one end and a plate face of the other end are pivoted about the first turning shaft and about a third turning axis, respectively, the first reinforcement member being adapted to reinforce the first planar member; and
        a second planar member of which a plate face of one end is turnably pivoted about the second turning shaft and a plate face of the other end is turnably pivoted about the fourth turning shaft, respectively, and
    wherein said each rotational member relatively rolls along said each first guide face of said each first planar member, whereby said mount base pivoted about said each link mechanism is configured to be elevated at a trajectory that corresponds to a shape of said each first guide face.

2. A height adjuster for a seat of a vehicle as claimed in claim 1, wherein a second reinforcement member having a second guide face that is formed in a shape identical to the first guide face is fixed between the first planar member and the first reinforcement member in said each link mechanism, and wherein said each rotational member relatively rolls along said each first guide face of said each first planar member and said each second guide face of said each second reinforcement member, whereby said mount base pivoted about said each link mechanism is configured to be elevated at a trajectory that corresponds to a shape of each of the first and second guide faces.

3. A height adjuster for a seat of a vehicle as claimed in claim 1, comprising:
    a swivel device for swiveling the support base between a predetermined position in a vehicle chamber and a position toward the door opening; and
    a slide device for sliding the support base in a longitudinal direction of the vehicle.

4. A height adjuster for a seat of a vehicle as claimed in claim 2, comprising:
    a swivel device for swiveling the support base between a predetermined position in a vehicle chamber and a position toward the door opening; and
    a slide device for sliding the support base in a longitudinal direction of the vehicle.

* * * * *